United States Patent [19]

Jenkins

[11] 4,229,499

[45] Oct. 21, 1980

[54] ACID PHTHALATE CRYSTAL

[75] Inventor: Ronald Jenkins, Peekskill, N.Y.

[73] Assignee: North American Philips Corporation, New York, N.Y.

[21] Appl. No.: 918,674

[22] Filed: Jun. 23, 1978

[51] Int. Cl.[2] .......... B32B 5/16; B32B 9/00

[52] U.S. Cl. .......... 428/336; 250/272; 428/403; 428/457; 428/913

[58] Field of Search .......... 428/333, 412, 458, 457, 428/334, 403, 336, 335, 913; 250/272–276; 427/65, 160

[56] References Cited

U.S. PATENT DOCUMENTS

| | | | |
|---|---|---|---|
| 2,497,543 | 2/1950 | Frevel | 250/272 |
| 3,546,453 | 12/1970 | Browning et al. | 250/276 X |
| 3,927,319 | 12/1975 | Wittry | 250/273 |
| 4,084,089 | 4/1978 | Zingaro et al. | 250/272 |

FOREIGN PATENT DOCUMENTS

| | | | |
|---|---|---|---|
| 1327085 | 8/1973 | United Kingdom | 428/333 |

*Primary Examiner*—Paul J. Thibodeau
*Attorney, Agent, or Firm*—Thomas A. Briody; Jack Oisher; Paul R. Miller

[57] ABSTRACT

An X-ray analyzing crystal exhibiting good deterioration resistant qualities, comprising an acid phthalate crystal and a relatively inert layer disposed at a surface of said layer, which surface is intended for impingement by X-rays.

15 Claims, 2 Drawing Figures

ACID PHTHALATE CRYSTAL

BACKGROUND OF THE INVENTION

The present invention relates to crystals related to X-ray analysis.

In the prior art, acid phthalate crystals are used in, inter alia, a wavelength dispersive spectrometer for the diffraction of characteristic wavelengths from the low atomic number elements, there being employed as such acid phthalate crystals, acid phthalate salts of potassium, rubidium, thallium, and ammonium.

One of the more popular acid phthalate crystals is the rubidium acid phthalate (RAP) crystal, but these RAP crystals and at least some others suffer from a significant disadvantage, in that, after approximately one year of normal use in an X-ray spectrometer, which is known to the art, the diffracted intensity markedly drops off, commonly to a level that is only some 20% of the initial diffracted intensity value.

There has been reported in the literature (Fregerslev, "X-Ray Spectrometry", Vol. 6, No. 2, 1977) a deterioration of the reflectivity of the RAP crystal used for three years as an X-ray monochromator for sodium (PW 1220 spectrometer), such deterioration being to the extent that the crystal could no longer be used in the application.

It is believed that the above deterioration in the RAP crystal is due to surface deterioration of the crystal.

The article by Fregerslev proposes that the deteriorated crystal be carefully washed with distilled water using a chamois-leather, to restore the characteristics of the crystal, it being reported that such washing treatment results in the increase in the count rate back to 70% of that of the original crystal.

Thus, the acid phthalate crystals used in the prior art suffer from the described deterioration in properties and the techniques known to the art for restoring the properties of such crystals are relatively time-consuming and provide, at best, only a partial such restoration. A further disadvantage of the prior art acid phthalate crystals is that their gradual deterioration might be reflected in the analytical results obtained with such crystals, it, therefore, being necessary to compensate or correct for such deterioration, which is undesirable and time consuming, as well as introducing the possibility of significant error even where compensation or correction is done.

The present invention seeks to provide an improved acid phthalate crystal for use in X-ray and other applications, and, further, to overcome, or at least alleviate, the above described disadvantages of the prior art crystals.

Briefly described, the present invention comprises an acid phthalate crystal, e.g., rubidium acid phthalate or potassium acid phthalate, comprising at at least that portion of the crystal surface that is to be impinged by X-rays, a layer of metal or metalloid. It is possible that the entire crystal surface be covered by the metal or metalloid layer, although it is generally preferred that only the X-ray impinged surface area be covered.

PREFERRED EMBODIMENTS

Figure 1:
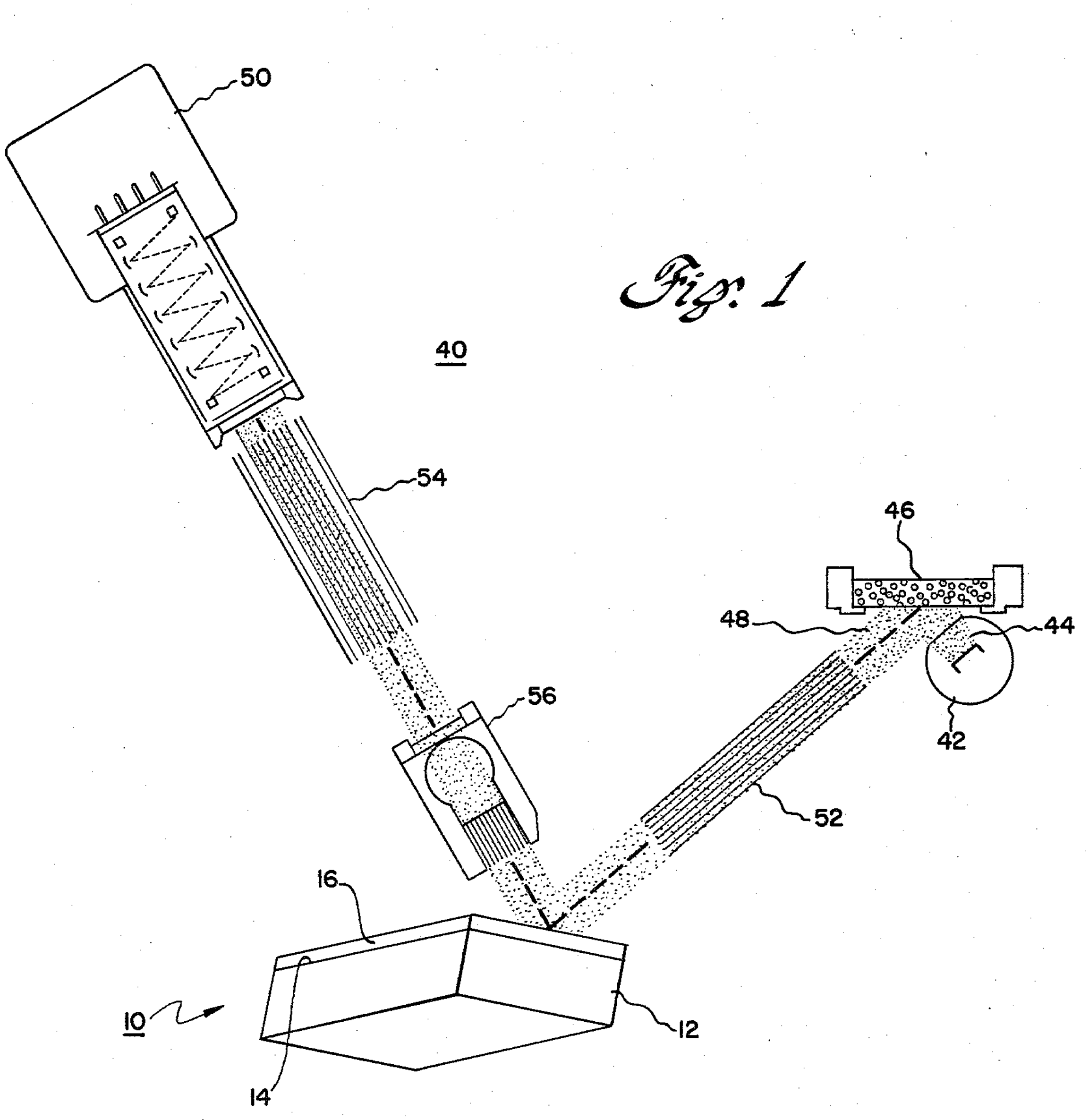
FIG. 1 is an isometric view schematically showing a crystal spectrometer employing an acid phthalate crystal according to an embodiment of the invention.

Referring to FIG. 1, the present invention comprises an analyzing crystal 10 that includes an acid phthalate crystal 12 (e.g. rubidium, thallium, potassium, or ammonium acid phthalate) having at a surface 14 thereof a metal or metalloid layer 16. While the layer 16 should be at that crystal surface that is impinged by X-rays (normally, a major surface), it is possible for some or all of the other crystal surfaces to be covered by such layers.

Figure 2:
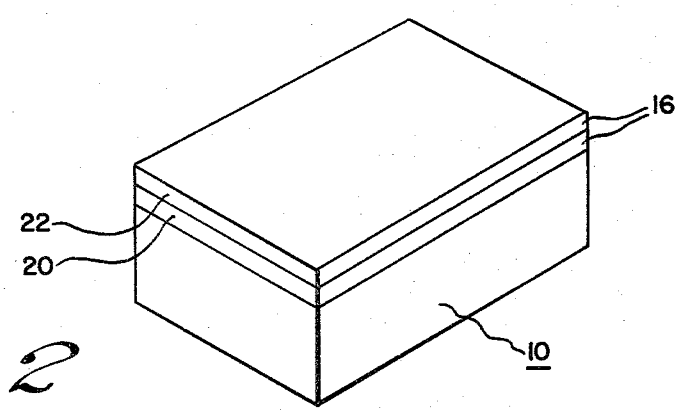
FIG. 2 is an isometric view of an acid phthalate crystal according to a further embodiment of the invention.

The metal or metalloid layer 16 should be chemically inert to oxidation or other ambient atmospheres and can be of essentially aluminum, gold, carbon, or perhaps mixtures or alloys of these metals or metalloids with each other and/or with other materials. It is desirable that the material of the layer 16 exhibit good adherence to the crystal 12, although it is possible for the layer 16 to constitute two or more sub-layers 20, 22 (FIG. 2), of which sub-layers, a first one 20 is disposed on the crystal 12 and has good adherence characteristics to the crystal 12 and to the overlying sub-layer 22 or sub-layers.

The first sub-layer 20 can be of a metal or other material that is not included in the class of materials that alleviate the acid phthalate crystal deterioration, e.g., a plastic film, it being used to afford good adherence to the crystal 12, while the second sub-layer 22 (or the further sub-layers where there are more than two) are or contain materials that are in this class of materials alleviating the crystal deterioration problem.

According to a further embodiment of the invention, the layer 16 can include two or more sub-layers that comprise respective materials that are both in the class of materials alleviating the crystal deterioration problem, e.g., aluminum, gold, etc.

It is preferred that the layer 16 be of such thickness as not to adversely affect the operation of the crystal and its related apparatus, e.g., not to attenuate to any significant extent the level and absorption of X-ray photons striking the analyzing crystal 10. Generally, the layer thickness is preferred to be about 2000 Å or less, it being more preferred that the thickness be in about the 300–2000 Å range for good protection of the acid phthalate crystal against deterioration and for good adherence to the acid phthalate crystal 12. It has been experimentally determined that a layer 16 of aluminum having a thickness of about 600 Å provides good adherence properties and affords the necessary protection of the crystal surface against deterioration.

The layer 16 can be provided by, e.g., deposition methods, such as evaporation, sputtering, etc., or by other suitable techniques.

In the spectrometer 40 (FIG. 1) incorporating the acid phthalate analyzing crystal 10 according to the invention, there are an X-ray source 42 that directs X-radiation 44 to a specimen 46, from which secondary radiation 48 emanates, striking the analyzing crystal 10 of acid phthalate. The crystal 10 diffracts the incident secondary radiation 48 in a manner known to the art and the diffracted radiation is measured by the scintillation counter 50 and the results are, thereafter, utilized. There can be a primary collimator 52 located in the secondary radiation path, between the specimen 46 and the analyzing crystal 10 and an auxiliary collimator 54 and a flow counter 56 in the path between the crystal 10 and the scintillation counter 50. The crystal 10 and the detector combination i.e., the counters 50, 56 are rotated in known fashion, a goniometer being used to control the rotational movement, as known to the art. For a more detailed description of the spectrometer, reference is made to Jenkins, *An Introduction to X-Ray Spectrometry*, Heyden, 1976, particularly pages 52 et seq.

I claim:

1. An X-ray analyzing crystal exhibiting good deterioration resistant qualities, comprising:

(a) an acid phthalate crystal having a first surface and
(b) a layer disposed at at least said first surface and having a thickness not exceeding about 2,000 Å, said layer consisting essentially of a material selected from the group consisting of a metal and metalloid, said metal and metalloid being substantially chemically inert to the ambient atmosphere.

2. An X-ray analyzing crystal as in claim 1, wherein said layer has a thickness exceeding about 300 Å.

3. An X-ray analyzing crystal as in claim 1, wherein said layer has a thickness of about 600 Å.

4. An X-ray analyzing crystal as in claim 1, wherein said layer comprises at least two sub-layers, a first said sub-layer being disposed on said first surface and a second said sub-layer being disposed over said first sub-layer, said first and second both consisting essentially of a material selected from said group.

5. An X-ray analyzing crystal as in claim 1, wherein said acid phthalate is selected from the group consisting essentially of rubidium acid phthalate, potassium acid phthalate, thallium acid phthalate, and ammonium acid phthallate.

6. An X-ray analyzing crystal exhibiting good deterioration resistant qualities, comprising:

(a) an acid phthalate crystal having a first surface and
(b) a layer disposed at at least said first surface and having a thickness not exceeding about 2,000 Å, said layer consisting essentially of a material selected from the group consisting of aluminum, gold, and carbon being substantially chemically inert to the ambient atmosphere.

7. An X-ray analyzing crystal as in claim 6, wherein said layer has a thickness exceeding about 300 Å.

8. An X-ray analyzing crystal as in claim 6, wherein said layer has a thickness of about 600 Å.

9. An X-ray analyzing crystal exhibiting good deterioration resistant qualities, comprising:

(a) an acid phthalate crystal having a first surface and
(b) a layer disposed at at least said first surface and having a thickness not exceeding about 2,000 Å, said layer consisting essentially of a material selected from the group consisting of mixtures and alloys of at least two of aluminum, gold and carbon being substantially chemically inert to the ambient atmosphere.

10. An X-ray analyzing crystal as in claim 9, wherein said layer has a thickness exceeding about 300 Å.

11. An X-ray analyzing crystal as in claim 9, wherein said layer has a thickness of about 600 Å.

12. An X-ray analyzing crystal exhibiting good deterioration resistant qualities, comprising:

(a) an acid phthalate crystal having a first surface and
(b) a layer disposed at at least said first surface and having a thickness not exceeding about 2,000 Å, said layer consisting essentially of a material selected from the group consisting of alloys and mixtures containing at least one of aluminum, gold and carbon being substantially chemically inert to the ambient atmosphere.

13. An X-ray analyzing crystal as in claim 12, wherein said layer has a thickness exceeding about 300 Å.

14. An X-ray analyzing crystal as in claim 12, wherein said layer has a thickness of about 600 Å.

15. An X-ray analyzing crystal exhibiting good deterioration resistant qualities, comprising:

(a) an acid phthalate crystal having a first surface and
(b) a layer disposed at at least said first surface and having a thickness not exceeding about 2,000 Å, said layer comprising at least two sub-layers, a first sub-layer being disposed on said first surface and a second sub-layer being disposed over said first sub-layer, said second sub-layer consisting essentially of a material selected from the group consisting of a metal and metalloid, said metal and metalloid being substantially chemically inert to the ambient atmosphere, and said first sub-layer consisting essentially of a plastic material providing adherence between said first surface and said second sub-layer.

* * * * *